# United States Patent Office

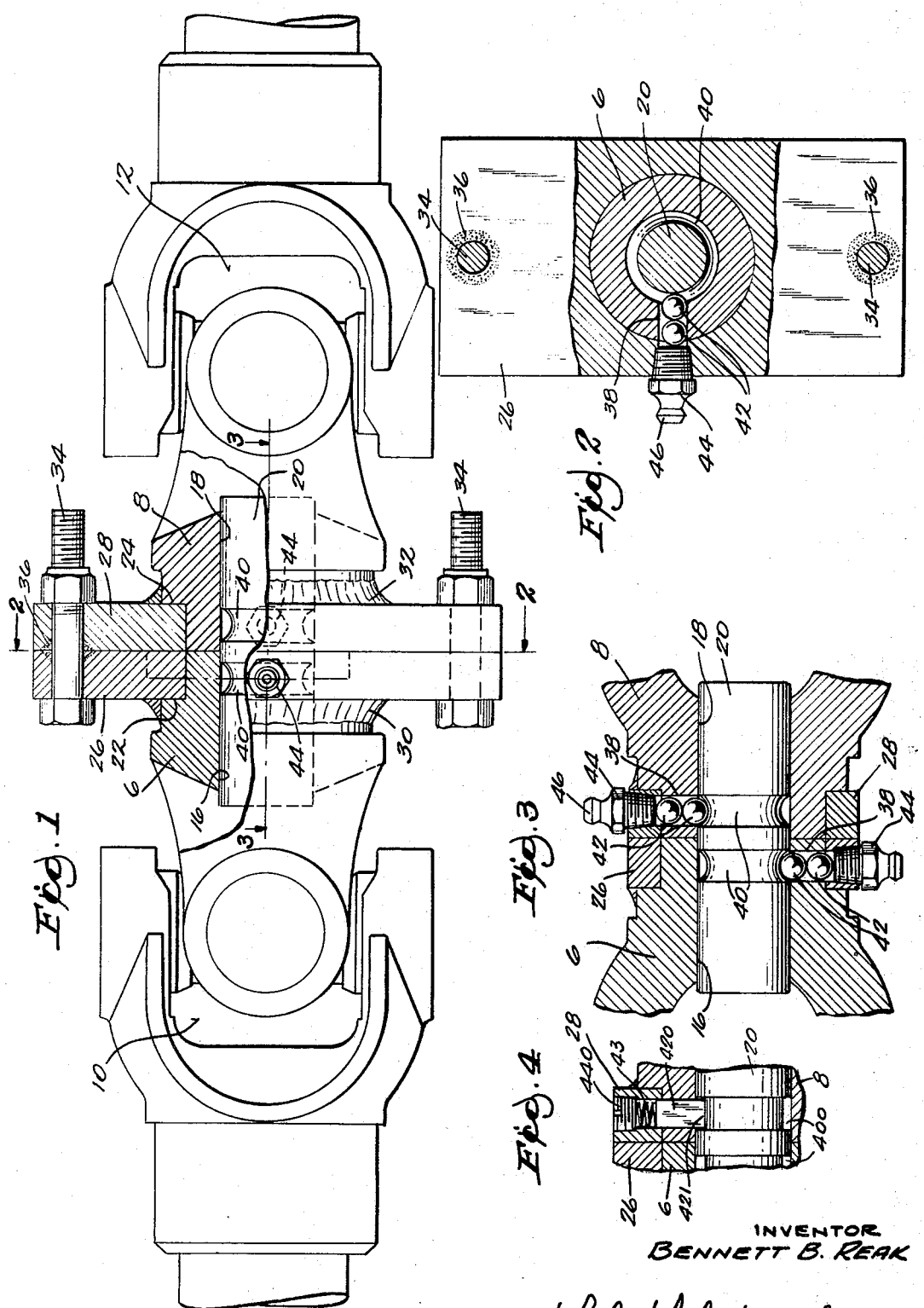

3,505,833
Patented Apr. 14, 1970

3,505,833
AUTOMATIC LUBRICATION FOR TORQUE LIMITING DEVICES
Bennett B. Reak, West Bend, Wis., assignor to Weasler Engineering & Mfg. Co., Inc., West Bend, Wis., a corporation of Wisconsin
Filed Oct. 25, 1968, Ser. No. 770,709
Int. Cl. F16d 3/56, 9/00
U.S. Cl. 64—28       9 Claims

ABSTRACT OF THE DISCLOSURE

Aligned shaft elements normally rotatable in unison are connected by torque limiting devices which release under predetermined load. Shear bolts are a simple example. Preferably the shaft elements are secured against axial separation when release occurs, and have normally inactive bearing surfaces and means to store and distribute lubricant to the bearing surfaces which are only subject to relative rotation when the torque limiting device is released.

BACKGROUND OF THE INVENTION

Normally there is no relative rotation whatever between the parts which are provided with a shear coupling or other torque limiting device. Hence, there is usually no reason for introducing or distributing lubricant between such parts. However, in the absence of lubricant, damage may be done by galling during relative rotation.

It is the object of the instant invention to distribute stored lubricant to parts which have relative movement only when the overload device functions. In some cases the lubricating means also holds the parts in axial alignment to permit them to turn freely but to preclude axial separation.

SUMMARY OF THE INVENTION

The invention is exemplified by a coupling between shaft elements which are provided with spaced universal joints such as are employed in the drive shafts of agricultural equipment. Socketed shaft elements of the respective joints are piloted on an intermediate shaft which holds the shaft elements in alignment but prevents them from separating axially.

Flanges fixed to the respective shaft elements are connected by torque limiting devices such as pins or bolts which are intended to shear under excessive load. Holes extend laterally through the flanges and the respective shaft elements to register with annular grooves provided on the pilot shaft. Retainers such as balls or other means inserted through these holes into the groove key the respective shaft elements to the pilot shaft in a manner to permit of relative rotation upon the occurrence of shearing, while preventing axial separation.

The holes and grooves store lubricant. For example, I may use conventional lubricating fittings through which lubrication can be inserted with a grease gun or the like to envelop the balls and partially fill the grooves into which the balls extend to perform the keying function above described. The balls are either biased or fixed to rest tightly in the groove to distribute grease if relative rotation occurs.

As long as the coupled shaft elements turn in unison the lubrication is never needed as such. However, when the overload device releases to permit relative rotation, the balls or other retainers force grease from the groove into the mating bearing surfaces.

BRIEF DESCRIPTION OF THE DRAWINGS

FIG. 1 is a view in side elevation of coupled universal joints, portions of the coupling between them being broken away.

FIG. 2 is an enlarged detail view taken in transverse section on the line 2—2 of FIG. 1.

FIG. 3 is a section on line 3—3 of FIG. 1.

FIG. 4 is a fragmentary detail view similar to FIG. 3 and showing a modification.

DESCRIPTION OF PREFERRED EMBODIMENT

While the invention is useful in any situation in which there are normally coupled shafts which have relative rotation when subjected to predetermined load, I have shown a fragment of a flexible drive shaft to exemplify the invention. The axially aligned shaft elements 6 and 8 are connected respectively with universal joints 10 and 12 which are a part of a flexible drive shaft. The shaft elements 6 and 8 have bores 16 and 18 respectively. A short length of pilot shaft 20 has a bearing in the respective bores 16 and 18 to hold shaft elements 6 and 8 in alignment.

The ends of the respective shaft elements 6 and 8 are annularly shouldered at 22 and 24 to receive flange plates 26 and 28 fastened to the respective shaft elements in any manner, welds 30 and 32 being merely an example. The plates 26 and 28 are in face contact in the assembled flexible drive and they are connected by some form of overload device such as the shear bolts 34 which pass through annular areas in which the respective plates 26 and 28 are hardened as indicated by the stippling at 36.

Extending laterally into each of the plates 26 and 28 is a cross bore 38 which passes through the adjacent portion of the shaft elements 6 or 8 as exemplified in FIG. 2. This bore 38 communicates with an annular groove 40 with which the pilot shaft 20 is provided. As shown, the groove 40 is of circular cross section to mate with the illustrated exemplification in which a ball or balls 42 in the bore 38 provide a rotatable key between the respective shaft element and the pilot shaft 20 to preclude axial separation of the parts while permitting free relative rotation in the event that the bolts 34 become sheared. It will be understood that the grease distributing member need not be a ball but may have any mating configuration 421 registering wtih a corresponding groove 400 as shown in FIG. 4. It is further to be noted that any of the devices shown may have a rubber or helical spring 43 biasing it into the groove under pressure sufficient to require it to overcome centrifugal force and to displace stored lubricant for distribution to relatively moving bearing surfaces.

Holding the displacing member in the bore is any appropriate plug, with or without biasing means. For example, I have shown a conventional lubrication fitting 44 designed at 46 for attachment of a grease gun (not shown). Through this fitting, grease is introduced into the bore and through the bore into the annular channel 40 to store grease until needed because of movement between the coupled parts.

In the event of release of the overload device, as by the shearing of the bolts 34, at least one of the shaft elements 6 or 8 will tend to rotate with respect to the pilot shaft 20. This will cause one of the grease distributing members such as the element 420 or a ball or balls 42 to move about the channel 40 into which it projects. In the course of such movement, it will tend to distribute the grease ahead of it and will thereby cause grease to enter the bearing surfaces between the pilot and the respective shaft element so that no damage will be done to the parts during such rotation.

I claim:

1. The combination of first and second members having coupling means including an overload device normally connecting them for rotation in unison, and having com-` plementary bearing surfaces, the said bearing surfaces being relatively rotatable when a predetermined load is exceeded, means providing a lubricant storage channel between the respective bearing surfaces, and lubricant distributing means connected with one of said last mentioned members and disposed in the channel to move circumferentially in the channel when there is relative movement between the said bearing surfaces, whereby to distribute stored lubricant from said channel around portions of the said bearing surfaces.

2. A combination according to claim 1 in which one of said members is provided with a fitting connected for lubricant delivery into said channel, the channel being largely in one of said members, said last means and said channel having complementary surfaces and said last means having means for maintaining said surfaces in substantial contact.

3. A combination according to claim 1 in which one of said members is a pilot shaft rotatably mounted in the other of said members and also rotatably mounted in a third member, the shaft being provided with channels opposite bearing surfaces with which said other member and said third member are provided, each of said other member and said third member having a lubricant fitting registering with respective channels and further having a bore extending from its respective fitting and communicating with the respective channels, the lubricant distributing means comprising at least one ball in each said bore and extending into each said channel.

4. A combination according to claim 3 in which said coupling means comprises generally radial flanges in substantial contact and provided with shear bolt connections about which the respective flanges have hardened portions, the ball confined in each radial bore and extending into the respective channels constituting means for keying the members against axial separation.

5. The combination of driving and driven members, one of said members having a projecting shaft section disposed in a bore with which the other member is provided, coupling means comprising an overload device and normally releasably connecting said members for normal rotation in unison, said projecting shaft section and said other member having complementary bearing surfaces, one of which has a peripheral channel and the other of which has a socket opening into the channel, and means in the socket projecting into said channel for keying together said other member and said shaft section while permitting relative rotation between said other member and shaft section upon release of said coupling means.

6. A combination according to claim 5 in which both of said members have bores providing bearing surfaces in each of which said shaft section is relatively rotatable upon the release of said coupling means, the shaft section having peripheral channels normally disposed in the bores of respective members, said members having sockets provided with balls projecting into the respective channels for keying said members to said shaft section while accommodating relative rotation upon release of said overload device.

7. A combination according to claim 5 in which said sockets comprise transverse bores having plugs and each of said transverse bores having a plurality of balls in sequence in the respective transverse bores, the periphery of the innermost of said plurality of balls being engaged as aforesaid in one of the respective channels.

8. A combination according to claim 7 in which the respective plugs comprise lubrication fittings for the introduction of lubricant into the respective channels past said balls, a respective innermost ball being adapted to travel its respective channel circumferentially upon the release of said overload device whereby to distribute on adjacent bearing surfaces lubricant stored in the respective channel.

9. A combination according to claim 5 in which the respective members are components of universal joints and said shearable coupling means comprises bolts traversing flanges which are in face contact and connected with respective members.

References Cited

UNITED STATES PATENTS

| 1,978,209 | 10/1934 | Kuhns | 64—28 XR |
| 2,487,449 | 11/1949 | Knudson | 64—28 |
| 2,748,578 | 6/1956 | Potts | 64—28 |
| 3,103,004 | 9/1963 | Murray. | |

JAMES A. WONG, Primary Examiner